3,542,929
CHEMOTHERAPEUTIC COMPOSITIONS USEFUL IN ANIMAL DETOXIFICATION
Eugene Roberts, Pasadena, Calif., assignor to City of Hope, Duarte, Calif., a National Medical Center incorporated in California
No Drawing. Filed Feb. 23, 1966, Ser. No. 529,196
Int. Cl. A61k 27/00
U.S. Cl. 424—317                                    5 Claims

ABSTRACT OF THE DISCLOSURE

A therapeutic composition for animal detoxification consisting of a mixture of salts, acids, or bases to yield, per mol part of arginine, from one-half to one part each of glutamate and alphaketoglutarate and up to one-and-one-half parts of oxalacetate.

---

This invention relates to novel chemotherapeutic compositions having usefulness for detoxifying animals.

Protection against the toxic effect of various substances, particularly those affecting the liver or the brain of animals, and more particularly, substances such as hydrazine, dimethyl hydrazine, and related compounds is a great desideratum in the field of toxicology and especially preventive medicine. Respecting hydrazine in particular, it appears that no satisfactory treatment has been heretofore available, either as a pretreatment or as an after-treatment for animals subject to intoxication with this substance. The implications of this in the field of preventive medicine are widespread, especially in view of the usage of hydrazine and its closely related compounds in present day technology.

Where a treatment is routinely used as a preventive measure, it is clearly desirable that the treatment itself should be as harmless and as free from side effects as possible, for the expected exposure to hydrazine or the like may not necessarily always ensue.

An object of the present invention is to provide a novel composition of known animal metabolites, said composition having utility in the treatment of animals against chemical intoxication, particularly of hydrazine and its related compounds.

Generally speaking and in accordance with an illustrative embodiment of my invention, I administer to an animal subject to intoxication, for example, with hydrazine, a composition consisting essentially of one mol-part of arginine, from one-half to one-and-one-half parts of glutamate; from one-half to one-and-one-half parts of alpha-ketoglutarate; and from zero up to one-and-one-half parts of oxalacetate. The composition is administered by any conventional route, which may be oral, although in the case of small animals such as mice preferably by intraperitoneal injection. Where the method of administration permits, the composition may be administered in its dry, powdered from, for example, in capsules. Likewise, it may be taken orally in solution, for example, in water; of course, for intraperitoneal injection, a solution is requisite.

The parts referred to are mol parts. Thus, one mol of arginine is 174 grams; and correspondingly for the other components of my composition. For convenience, I have recited the components other than arginine in their anionic nomenclature, i.e., in salt form, although it will be understood that the free acids may be employed in preparing the composition. Thus, arginine is strongly basic, but may be employed in its salt form, for example, as the hydrochloride. Indeed, the arginine and the gultamate may be utilized in the form of their mutual salt, viz., arginine glutamate. Subject to the overall alkalinity considerations discussed below, the glutamate may be supplied to the composition in the form of free glutamic acid, monosodium glutamate, or even glutamic acid hydrochloride. The alpha-ketoglutarate may be supplied as the free acid or as the sodium salt; and the oxalacetate again as the free acid or the sodium salt. In any case, when the relative proportions, within the scope of the invention, of the several components have been selected and put together to form my inventive composition, the pH resulting from dilute solutions of the composition in water should of course be physiologically suitable, that is, from about 5.5 to about 8.0. If this does not result from the interaction and mutual neutralization of the several components then it should be adjusted by inclusion in the composition of a suitable amount of alkali or acid, as the case may be, such as sodium hydroxide or hydrochloric acid. In view of the fact that the two amino acid components are available as already explained in a considerable variety of salts and acid salts, and the other two components are available either as the free acids or as the simple sodium salts, the need for such additional neutralization will not always occur.

The composition is formed by a simple mixing of the components preferably in their dry, powdered form. Such compositions are quite stable, especially when protected from light, heat, and dampness. Where the composition is supplied in the form of an aqueous solution, it should be used promptly, or stored at low temperatures when storage is unavoidable in order to avoid oxidation and other deterioration of the solution.

The dosage in which my composition is used, whether for preventive therapy or treatment of intoxication, is preferably within the range of 0.2 millimols to 40 millimols, total of the several components of the composition, per kilogram weight of the animal per diem of twenty-four hours.

The components of my inventive composition are all commercially available. Furthermore, they are all known metabolites, and are, accordingly, always present in the normal animal organism. This makes for complete tolerance by the treated animal.

Some examples of composition within the scope of the invention will now be given:

EXAMPLE 1

|  | Gms. |
|---|---|
| Arginine glutamate (1 mol) | 321 |
| Sodium alpha-ketoglutarate (1 mol) | 170 |
| Sodium oxalacetate (¼ mol) | 39 |
| Oxalacetic acid (¼ mol) | 33 |

The arginine glutamate was prepared in accordance with U.S. 2,851,484. The other components were the commercially available compounds; all were in powder form, and were mixed and placed in a closed jar for later use.

EXAMPLE 2

|  | Gms. |
|---|---|
| Arginine (0.1 mol) | 17.4 |
| Glutamic acid (0.1 mol) | 14.7 |
| Alpha-ketoglutamic acid (0.12 mol) | 17.5 |

The compounds were dissolved in one liter of distilled water, and 0.1 normal sodium hydroxide added to a pH of 6.8.

EVAMPLE 3

|  | Gms. |
|---|---|
| Arginine (0.1 mol) | 17.4 |
| Glutamic acid (0.1 mol) | 14.7 |
| Alpha-ketoglutamic acid (0.1 mol) | 14.6 |
| Oxalacetic acid (0.1 mol) | 13.2 |

The components were dissolved in 0.1 liter of distilled water, and sodium hydroxide added to a pH of 7.0.

To demonstrate the efficacy and utility of the invention in the protection against acute hydrazine toxicity in mice, a solution in accordance with Example 3 was used on Swiss mice of both sexes of an inbred Swiss stock weighing approximately 25 grams. After starving for 18 hours, they were injected either with the test solution in accordance with Example 3 or with an equal volume of physiologic saline solution, followed in 30 minutes by the injection of various amounts of a freshly prepared solution of hydrazine prepared by adding sodium hydroxide to hydrazine sulphate to a pH of 7.0. The animals were then observed at the end of two hours. The cumulative mortality for nine control groups and ten treated groups is shown in the following tabulation, the figures having been derived by plotting the values and fitting the best curves:

TABLE I

| Cumulative mortality, percent | Corresponding dosage of hydrazine, millimol/kg. | |
|---|---|---|
| | Control | Ex. 3 |
| 0 | 2.0 | 3.4 |
| 40 | 2.5 | 4.2 |
| 60 | 2.7 | 4.7 |
| 80 | 3.0 | 6.0 |
| 100 | 3.5 | 6.0 |
| $LD_{50}$ values | 2.65 | 4.54 |

It is evident from the results just given that complete protection was afforded by treatment of the animals in accordance with the invention.

It will be understood that while I have illustrated my invention with the aid of numerous specific examples, considerable variations in relative proportions, dosage, and technique of administration is possible within the scope of my invention as set forth in the claims which follow.

In the claims which follow, "part" means mol-part, as already explained. Likewise, the components recited may be supplied to the composition in any of their respective free acid, free base, salt, or acid salt form or the like, as the case may be, already explained, so that the terms used in the claims are to be so construed.

Further, the term "detoxification" includes preventive, i.e., ante factum, as well as remedial, i.e., post factum, therapy.

Having described my invention, I claim:

1. A composition of matter useful in animal detoxification comprising: a mixture selected from the salts, free acids, and free bases of arginine, glutamic acid, alpha-ketoglutaric acid, and oxalacetic acid in such relative proportions as to provide, on a molar basis, one part of arginine; from one-half to one-and-one-half parts each of glutamate and alphaketoglutarate; and up to one-and-one-half parts of oxalacetate.

2. A therapeutic composition in accordance with claim 1 for providing protection against the toxic effects of hydrazine in said animals containing an admixture of pH adjusting compound chosen from the class consisting of physiologically acceptable acids and bases in quantity sufficient to yield a composition having a pH of from about 5.5 to about 8.0 in dilute aqueous solution.

3. A composition in accordance with claim 2 in which said compound is hydrochloric acid.

4. A composition in accordance with claim 2 in which said compound is sodium hydroxide.

5. The process of treating an animal subject to chemical intoxication comprising administering to said animal a quantity of composition in accordance with claim 1, at a treatment dosage of from 0.2 to 40 total millimols of the components of said composition per kilogram weight of such animal per diem of 24 hours.

References Cited

Jenney et al., Journ. Pharmacol and Exptl. Therapeutics, vol. 122, 1958 pp. 110, 111, 114 and 115.

Greenstein et al., Arch. Biochem and Biophys., vol. 64, 1956, pp. 342, 343, 347 and 348.

ALBERT T. MEYERS, Primary Examiner

D. M. STEPHENS, Assistant Examiner

U.S. Cl. X.R.

424—319